(12) United States Patent
Wei et al.

(10) Patent No.: US 8,173,087 B2
(45) Date of Patent: May 8, 2012

(54) GASOLINE ENGINE EMISSIONS TREATMENT SYSTEMS HAVING PARTICULATE TRAPS

(75) Inventors: Junmei Wei, Berkeley Heights, NJ (US); Knut Wassermann, Princeton, NJ (US); Yeujin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 501 days.

(21) Appl. No.: 12/365,182

(22) Filed: Feb. 4, 2009

(65) Prior Publication Data

US 2009/0193796 A1 Aug. 6, 2009

Related U.S. Application Data

(60) Provisional application No. 61/026,190, filed on Feb. 5, 2008.

(51) Int. Cl.
*B01D 53/94* (2006.01)
*F01N 3/10* (2006.01)

(52) U.S. Cl. .............. 423/213.2; 423/213.5; 423/245.3; 423/247; 423/239.1; 423/215.5; 60/299; 60/276; 60/297

(58) Field of Classification Search .............. 423/213.2, 423/213.5, 245.3, 247, 239.1, 215.5; 60/299, 60/276, 297; 55/524, DIG. 30
See application file for complete search history.

(56) References Cited

U.S. PATENT DOCUMENTS

| | | | |
|---|---|---|---|
| 4,171,288 A | 10/1979 | Keith et al. | |
| 4,329,162 A | 5/1982 | Pitcher, Jr. | |
| 4,902,487 A | 2/1990 | Cooper et al. | |
| 4,961,917 A | 10/1990 | Byrne | |
| 5,221,484 A | 6/1993 | Goldsmith et al. | |
| 5,492,679 A | 2/1996 | Ament et al. | |
| 5,496,788 A | 3/1996 | Domesle et al. | |
| 5,516,497 A | 5/1996 | Speronello et al. | |
| 5,643,542 A | 7/1997 | Leyrer et al. | |
| 5,716,899 A | 2/1998 | Guile et al. | |
| 5,935,897 A | 8/1999 | Trubenbach et al. | |
| 5,941,918 A | 8/1999 | Blosser | |
| 5,958,829 A | 9/1999 | Domesle et al. | |
| 6,019,946 A | 2/2000 | Castillo et al. | |
| 6,167,696 B1 | 1/2001 | Maaseidvaag et al. | |
| 6,753,294 B1 | 6/2004 | Brisley et al. | |
| 6,767,526 B1 | 7/2004 | Blanchard et al. | |
| 6,800,107 B2 | 10/2004 | Ishihara et al. | |
| 6,912,847 B2 | 7/2005 | Deeba | |
| 7,048,894 B2 | 5/2006 | Tanaka et al. | |
| 7,078,004 B2 | 7/2006 | Voss et al. | |
| 7,093,428 B2 | 8/2006 | LaBarge et al. | |

(Continued)

FOREIGN PATENT DOCUMENTS

EP 0766993 4/1997

(Continued)

*Primary Examiner* — Timothy Vanoy
(74) *Attorney, Agent, or Firm* — Melanie L. Brown

(57) ABSTRACT

Provided are exhaust systems and components suitable for use in conjunction with gasoline direct injection (GDI) engines to capture particulates in addition to reducing gaseous emission such as hydrocarbons, nitrogen oxides, and carbon monoxides. Exhaust treatment systems comprising a three-way conversion (TWC) catalyst located on a particulate trap are provided. An exemplary particulate trap is a soot filter. Additional treatment components can be added downstream of the particulate trap, including $NO_x$ traps and SCR catalysts. The TWC catalyst can be coated on both the inlet side and the outlet side of the particulate trap. Alternatively, an oxidation catalyst can be deposited on a particulate trap. Methods of making and using the same are also provided.

21 Claims, 7 Drawing Sheets

U.S. PATENT DOCUMENTS

| | | |
|---|---|---|
| 7,094,728 B2 | 8/2006 | Yan et al. |
| 7,097,817 B2 | 8/2006 | Brisley et al. |
| 7,107,763 B2 | 9/2006 | Suwabe et al. |
| 7,110,904 B2 | 9/2006 | Lippa et al. |
| 7,225,613 B2 | 6/2007 | Hammerle et al. |
| 7,229,597 B2 | 6/2007 | Patchett et al. |
| 7,297,656 B2 | 11/2007 | Zhang et al. |
| 7,306,771 B2 | 12/2007 | Okawara |
| 7,326,270 B2 | 2/2008 | Hong et al. |
| 7,341,614 B2 | 3/2008 | Hayashi et al. |
| 7,351,382 B2 | 4/2008 | Pfeifer et al. |
| 7,381,682 B1 | 6/2008 | Jia et al. |
| 7,381,683 B1 | 6/2008 | Wang et al. |
| 7,393,377 B2 | 7/2008 | Kasai et al. |
| 7,393,808 B2 | 7/2008 | Yoshida et al. |
| 7,427,308 B2 | 9/2008 | Taoka et al. |
| 7,431,749 B2 | 10/2008 | Kim et al. |
| 7,449,427 B2 | 11/2008 | Ohno et al. |
| 7,462,216 B2 | 12/2008 | Kunieda et al. |
| 7,465,690 B2 | 12/2008 | Yan |
| 7,517,502 B2 | 4/2009 | Ohno et al. |
| 7,517,826 B2 | 4/2009 | Fujdala et al. |
| 7,517,830 B2 | 4/2009 | Nomura et al. |
| 7,534,738 B2 | 5/2009 | Fujdala et al. |
| 7,541,006 B2 | 6/2009 | Yoshida |
| 7,550,117 B2 | 6/2009 | Alward et al. |
| 7,559,967 B2 | 7/2009 | Oya et al. |
| 7,585,471 B2 | 9/2009 | Oshimi |
| 7,601,105 B1 | 10/2009 | Gipson, III et al. |
| 7,605,109 B1 | 10/2009 | Jia et al. |
| 7,610,753 B2 | 11/2009 | Kitahara |
| 7,611,680 B2 | 11/2009 | Jia et al. |
| 7,666,376 B2 | 2/2010 | Dornseiffer et al. |
| 7,709,414 B2 | 5/2010 | Fujdala et al. |
| 7,745,367 B2 | 6/2010 | Fujdala et al. |
| 7,754,160 B2 | 7/2010 | Miyairi et al. |
| 7,772,151 B2 | 8/2010 | Li et al. |
| 7,799,298 B2 | 9/2010 | Pfeifer et al. |
| 7,832,203 B2 | 11/2010 | Chiffey et al. |
| 8,007,556 B2 * | 8/2011 | Bardon et al. .................. 55/523 |
| 2001/0026838 A1 | 10/2001 | Dettling et al. |
| 2004/0065078 A1 | 4/2004 | Schafer-Sindlinger et al. |
| 2004/0219077 A1 | 11/2004 | Voss et al. |
| 2005/0016164 A1 | 1/2005 | Chiffey et al. |
| 2005/0031513 A1 | 2/2005 | McNamara et al. |
| 2005/0109023 A1 | 5/2005 | Kudo et al. |
| 2005/0159308 A1 | 7/2005 | Bliss et al. |
| 2006/0032203 A1 | 2/2006 | Komori et al. |
| 2006/0057046 A1 | 3/2006 | Punke et al. |
| 2006/0093784 A1 | 5/2006 | Komori et al. |
| 2006/0133969 A1 | 6/2006 | Chiffey et al. |
| 2006/0142153 A1 | 6/2006 | Endo et al. |
| 2006/0193757 A1 | 8/2006 | Li et al. |
| 2006/0210765 A1 | 9/2006 | Ohno et al. |
| 2006/0263574 A1 | 11/2006 | Tsunekawa et al. |
| 2006/0292340 A1 | 12/2006 | Ohno et al. |
| 2007/0009400 A1 | 1/2007 | Vakkilainen et al. |
| 2007/0019217 A1 | 1/2007 | Chang |
| 2007/0048494 A1 | 3/2007 | Miyairi et al. |
| 2007/0054803 A1 | 3/2007 | Miyairi |
| 2007/0134138 A1 | 6/2007 | Matsuo et al. |
| 2007/0137187 A1 | 6/2007 | Kumar |
| 2007/0140928 A1 | 6/2007 | Beall et al. |
| 2007/0148402 A1 | 6/2007 | Ohno et al. |
| 2007/0224092 A1 | 9/2007 | Miyairi et al. |
| 2007/0227109 A1 | 10/2007 | Hong et al. |
| 2007/0264486 A1 | 11/2007 | Verdier |
| 2008/0020922 A1 | 1/2008 | Li et al. |
| 2008/0044319 A1 | 2/2008 | Takahashi et al. |
| 2008/0092499 A1 | 4/2008 | Otsuka et al. |
| 2008/0124264 A1 | 5/2008 | Ikeda et al. |
| 2008/0125316 A1 | 5/2008 | Noda et al. |
| 2008/0241015 A1 | 10/2008 | Kudo et al. |
| 2008/0254978 A1 | 10/2008 | Kikuchi et al. |
| 2008/0292513 A1 | 11/2008 | Miyairi |
| 2008/0317646 A1 | 12/2008 | Morisaka et al. |
| 2009/0047188 A1 | 2/2009 | Miyairi et al. |
| 2009/0087365 A1 | 4/2009 | Klingmann et al. |
| 2009/0129995 A1 | 5/2009 | Pfeifer et al. |
| 2009/0137386 A1 | 5/2009 | Pfeifer et al. |
| 2009/0193796 A1 | 8/2009 | Wei et al. |
| 2009/0199539 A1 | 8/2009 | Maunula et al. |
| 2009/0229259 A1 | 9/2009 | Mizutani |
| 2009/0238733 A1 | 9/2009 | Ohno et al. |
| 2009/0246098 A1 | 10/2009 | Endo et al. |
| 2009/0246109 A1 | 10/2009 | Southward |
| 2009/0247396 A1 | 10/2009 | Mizutani |
| 2009/0247399 A1 | 10/2009 | Mizutani et al. |
| 2009/0257935 A1 | 10/2009 | Southward et al. |
| 2009/0285736 A1 | 11/2009 | Schafer-Sindlinger et al. |
| 2009/0324455 A1 | 12/2009 | Mizutani |
| 2010/0003453 A1 | 1/2010 | Sato et al. |
| 2010/0003454 A1 | 1/2010 | Sato et al. |
| 2010/0011749 A1 | 1/2010 | Fujiwara et al. |
| 2010/0037600 A1 | 2/2010 | Doring |
| 2010/0077727 A1 | 4/2010 | Southward et al. |
| 2010/0098903 A1 | 4/2010 | Tsuneyoshi et al. |
| 2010/0275579 A1 | 11/2010 | Klingmann et al. |
| 2011/0030346 A1 | 2/2011 | Neubauer et al. |
| 2011/0091361 A1 | 4/2011 | Reinsch et al. |

FOREIGN PATENT DOCUMENTS

| | | |
|---|---|---|
| WO | WO-01/12320 | 2/2001 |
| WO | WO-2009/139107 | 11/2009 |
| WO | WO-2009/144573 | 12/2009 |
| WO | WO-2010/009929 | 1/2010 |
| WO | WO-2010/058834 | 5/2010 |
| WO | WO-2010/076509 | 7/2010 |

* cited by examiner

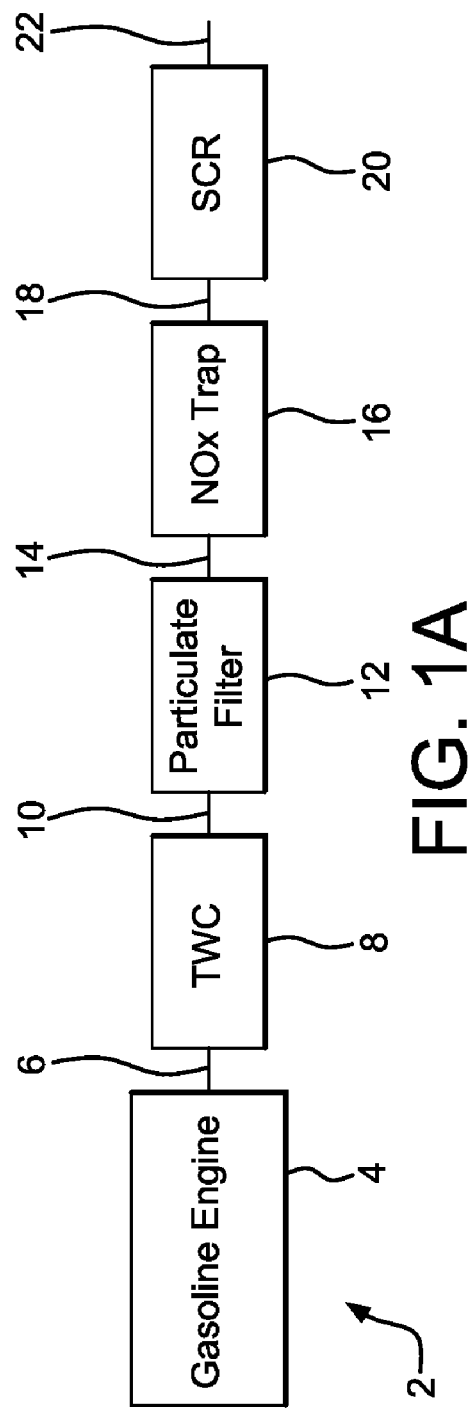
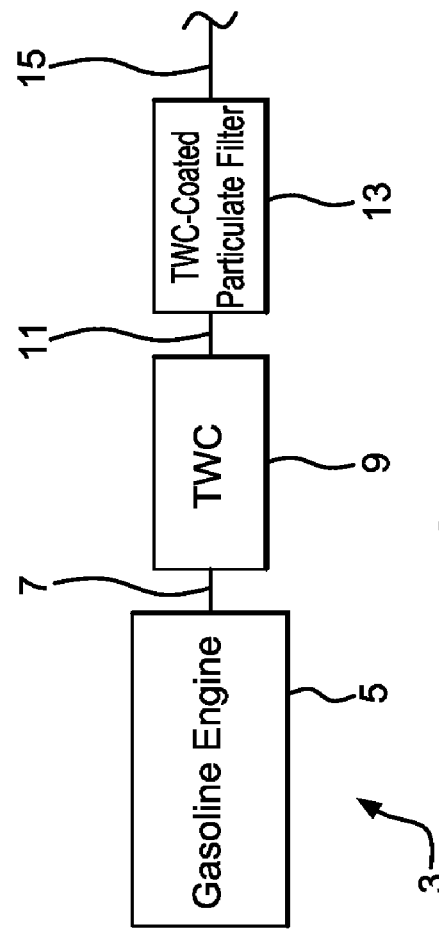
FIG. 1A
FIG. 1B

GASOLINE ENGINE EMISSIONS TREATMENT SYSTEMS HAVING PARTICULATE TRAPS

CROSS REFERENCE TO RELATED APPLICATIONS

This application claims priority to U.S. Provisional Patent Application No. 61/026,190, filed Feb. 5, 2008, which is hereby incorporated by reference in its entirety.

TECHNICAL FIELD

This invention pertains generally to emission treatment systems having catalysts used to treat gaseous streams of gasoline direct injection (GDI) engines containing hydrocarbons, carbon monoxide, and oxides of nitrogen in conjunction with particulates. More specifically, this invention is directed to three-way conversion (TWC) catalysts or oxidation catalysts, coated onto particulate traps such as soot filters.

BACKGROUND

Although historically, gasoline engines operated in ways such that particulates were not formed, gasoline direct injection (GDI) engines can have lean burn conditions and stratified combustion resulting in the generation of particulates. Particulate emissions for direct injection engines are being subject to regulations including the upcoming Euro 5 (2009) and 6 (2014) standards. Existing aftertreatment systems for gasoline engines are not suitable for achieving the proposed particulate matter standard. In contrast to particulates generated by diesel lean burning engines, the particulates generated by gasoline direct injection engines tend to be finer and in lesser quantities. This is due to the different combustion conditions of a diesel engine as compared to a gasoline engine. For example, gasoline engines run at a higher temperature than diesel engines. Also, hydrocarbon components are different in the emissions of gasoline engines as compared to diesel engines.

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

With respect to treatment of diesel exhaust gases and particulates, the prior art generally provides for an oxidation catalyst upstream of a particulate filter. A clean-up catalyst downstream of an oxidation catalyst and a particulate filter combination is provided in U.S. Patent Application Pub. No. 2007/0137187 (Kumar). Suitable clean-up catalysts downstream of the filter include another oxidation catalyst or a three-way conversion (TWC) catalyst located on a substrate carrier such as a flow-through monolith.

Particulate filters used in diesel systems have been coated with, for example, soot burning catalysts that facilitate passive regeneration of soot. In addition, U.S. Pat. No. 7,229,597 (Patchett) provides a catalyzed SCR filter downstream of an oxidation catalyst for simultaneous treatment of nitrogen oxides ($NO_x$), particulate matter, and gaseous hydrocarbons. Further, U.S. Patent Application Pub. No. 2004/0219077 (Voss) discloses a catalyzed filter in communication with a diesel engine exhaust. Placement of catalysts on soot filters, however, leads to gradual loss of effectiveness due to deleterious components of the diesel exhaust stream. A sufficient loading of catalyst is needed to achieve treatment goals, but this should be balanced with the need to provide acceptable back pressure in the system.

There is a need to provide exhaust treatment systems for gasoline direct injection engines that emit particulates.

SUMMARY

Provided are exhaust systems and components suitable for use in conjunction with gasoline direct injection engines to capture particulates in addition to treating gaseous emissions such as hydrocarbons, nitrogen oxides, and carbon monoxides. Capture of particulates during cold start conditions is of interest.

Aspects include exhaust treatment systems comprising a three-way conversion (TWC) catalyst and a particulate trap. In one or more embodiments, the TWC catalyst is upstream of the particulate trap. Although the components can be individually housed as system configurations permit, in one or more embodiments, provided are integrated systems wherein the TWC catalyst and particulate trap are housed in the same canister. In this aspect, the particulate trap can be uncoated, or provided with a suitable catalyst to facilitate regeneration. Additional treatment components can be added downstream of the particulate trap, including one or more $NO_x$ traps followed by an SCR catalyst.

Other aspects include TWC catalyst compositions coated onto particulate traps. Such TWC catalysts can be composed to include soot burning aids for facilitating regeneration of the filter. TWC catalyst compositions are generally provided in washcoats. Layered TWC catalysts can have different compositions for different layers. Traditionally, TWC catalysts can comprise washcoat layers having loadings of up to 2.5 $g/in^3$ and total loadings of 5 $g/in^3$ or more. For use with particulate traps, due to backpressure constraints, TWC catalyst washcoat layer coatings could be much lower, for example, less than 1 $g/in^3$ (or even 0.7 $g/in^3$, 0.6 $g/in^3$, 0.5 $g/in^3$, 0.25 $g/in^3$, or 0.1 $g/in^3$) and still provide catalyst activity to oxidize carbon dioxide and hydrocarbons, as well as reduce nitrogen oxides ($NO_x$). In one or more embodiments, the TWC catalyst is coated on both the inlet side and the outlet side of the particulate trap. In other embodiments, the TWC catalyst is coated only on the inlet side of the particulate trap. A TWC-coated particulate trap can be located downstream of a first TWC catalyst, where the first TWC catalyst can be smaller than otherwise required due to the TWC functionality coated onto the particulate trap.

Other aspects include emission treatment systems downstream of a gasoline direct injection engine for treatment of an exhaust system comprising hydrocarbons, carbon monoxide, nitrogen oxides, and particulates, the emission treatment system comprising an oxidation catalyst or a three-way conversion catalyst deposited on a particulate trap to form a catalyzed particulate trap; one or more gas sensors; and an on-board diagnostic (OBD) system.

Still further aspects include methods of treating a gas comprising hydrocarbons, carbon monoxide, nitrogen oxides, and particulates, the method comprising: locating an emissions treatment system downstream of a gasoline direct injection engine; providing a catalyzed particulate trap comprising a three-way conversion (TWC) catalyst and a particulate trap in the emissions treatment system; and contacting exhaust gas from the engine with the catalyzed particulate trap. Methods can also include contacting the catalyzed particulate trap only during cold start conditions and bypassing the catalyzed particulate trap after cold start conditions.

BRIEF DESCRIPTIONS OF DRAWINGS

FIG. 1A is a schematic view showing an engine emission treatment system according to a detailed embodiment;

FIG. 1B is a schematic view showing an engine emission treatment system according to a detailed embodiment;

DETAILED DESCRIPTION

Figure 1C:
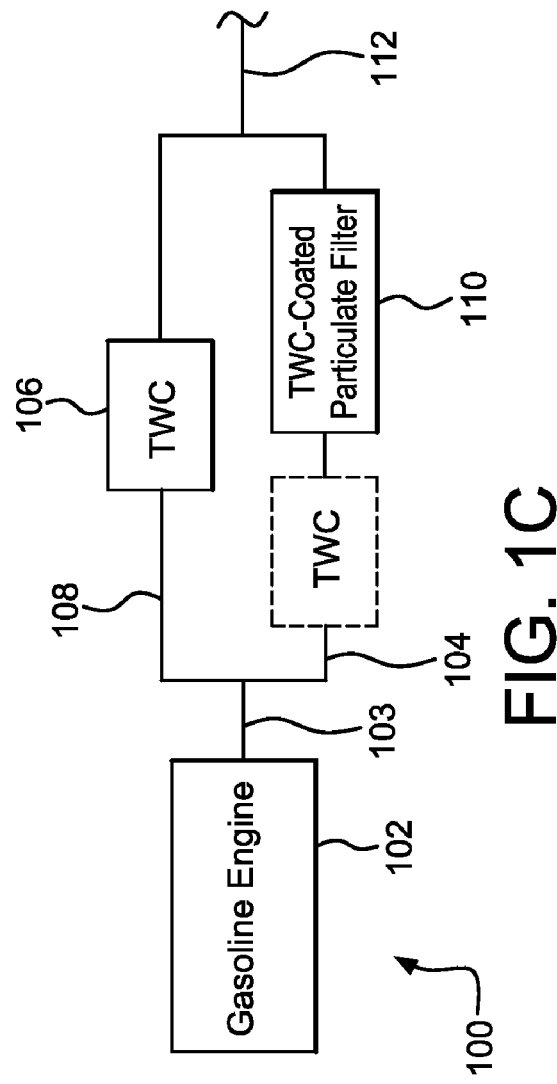
FIG. 1C is a schematic view showing an engine emission treatment system according to a detailed embodiment.

Provided are exhaust systems and components suitable for use in conjunction with gasoline direct injection (GDI) engines to capture particulates in addition to reducing gaseous emission such as hydrocarbons, nitrogen oxides, and carbon monoxides. GDI engines can be provided as either stoichiometric ($\lambda=1$) or lean ($\lambda>1$). For lean GDI engines, NOx traps are used. Backpressure and volume constraints in such systems, however, can limit the ability to add additional treatment components. In some GDI emissions systems, two or more TWC catalyst composites in combination with NOx traps and SCR catalysts are needed to achieve emissions standards. It is a challenge for such systems to accommodate any additional bricks or canisters along the exhaust pipe. As particulate standards become more stringent, however, there is a need to provide particulate trapping functionality without unduly crowding the exhaust pipe. We have surprisingly found that on a g/ft$^3$ basis, putting a catalyst, such as a three-way conversion (TWC) catalyst, washcoat on a wall-flow soot filter rather than on a traditional flow-through monolith provides comparable conversion. In so doing, particulate trapping capacity can be added to a system without unduly crowding the exhaust pipe.

Reference to lean burning gasoline engines means those engines configured by the manufacturers to be operating under lean conditions most of the time, that is, in excess of air and less than stoichiometric amounts of fuel. This means at a ratio of air to fuel that is greater than 14.7. Such characterization does not exclude occasional excursions into rich or stoichiometric conditions.

In order to reduce the back pressure increase due to the presence of a washcoat on a filter, the washcoat is typically located within the filter wall as uniformly as possible. The sizes of particulates generated from a GDI gasoline engine, however, are smaller than those from diesel engines. It is possible, then, that some of the particulates from the GDI gasoline engine could avoid being trapped by the filter by flowing though the filter walls when the filter is fresh. Filtration efficiency will be improved when a layer of soot is formed on the filter wall. To deal with the initial filtration efficiency problem, a thin layer of catalytic washcoat can be coated onto the filter wall (in contrast to depositing the layer within the wall). This catalytic washcoat layer is porous and can allow gas pass through while also filtering out the small particles. The layer can be 10-50 microns in thickness, specifically, 10-30 microns, and more specifically, 5 to 10 microns.

The catalyzed soot filter can be zoned in platinum group metal (PGM) distribution. That is, more PGM can be deposited in a front zone (upstream) of the filter and less PGM in a rear zone (downstream). When the soot filter is regenerated, the rear zone of the filter experiences the highest temperature of the filter, which can cause catalyst deactivation. By putting more PGM in the front zone, catalytic function of the catalyzed filter is preserved by repeated filter regenerations. In addition, during normal engine operation, the first zone is warmer than the rear zone. PGM zoning increases light-off activity under cold conditions. For example, it may be desirable to zone about 50% or more of the overall PGM loading in the first 20-50% axial distance of the filter, thereby loading 50% or less of the overall PGM loading in the rear 50-80% of the axial distance.

An aspect provides emission treatment systems downstream of a gasoline direct injection engine for treatment of an exhaust system comprising hydrocarbons, carbon monoxide, nitrogen oxides, and particulates, the emission treatment system comprising a three-way conversion (TWC) catalyst composition located upstream from or on a particulate trap. The TWC catalysts have the capability of simultaneously catalyzing the oxidation of hydrocarbons and carbon monoxide and the reduction of nitrogen oxides. A TWC catalyst can be coated onto a particulate trap at a loading low enough to provide emissions treatment without unduly increasing backpressure. For low porosity soot filters, only a small amount of TWC catalyst can be used in order to achieve suitable back pressure. For conditions that require high precious metal components, sufficient surface area from the support component is needed for good dispersion and a higher porosity soot filter is needed.

In an embodiment, the system further comprises a $NO_x$ trap, and SCR catalyst, or both located downstream of the particulate trap. An embodiment provides that the $NO_x$ trap is coated on the particulate trap, and this $NO_x$ trap-coated filter is located downstream of a TWC catalyst. Another embodiment provides that the SCR catalyst is coated on the particulate trap, and this SCR catalyst-coated filter is located downstream of a TWC catalyst and a $NO_x$ trap.

A further embodiment provides that the three-way catalyst composition may be deposited from an inlet side of the soot filter, or from the outlet side, or from both inlet and outlet sides. In one or more embodiments, the inlet side or the outlet side is coated with a washcoat comprising palladium, a support, and an oxygen storage component. A detailed embodiment provides that the oxygen storage component is present in an amount of up to 10% by weight of the total washcoat.

Other embodiments provide that the inlet side or the outlet side is coated with a washcoat comprising rhodium, a support, and an oxygen storage component. A detailed embodiment provides that the oxygen storage component is present in an amount of 10 to 25% by weight of the total washcoat.

Another aspect includes emission treatment systems downstream of a gasoline direct injection engine for treatment of an exhaust system comprising hydrocarbons, carbon monoxide, nitrogen oxides, and particulates, the emission treatment system comprising a catalyzed particulate trap having an oxidation catalyst or a three-way conversion catalyst deposited thereon; one or more gas sensors, and an on-board diagnostic (OBD) system. In an embodiment, the system of further comprises a $NO_x$ trap, an SCR catalyst, or both. Other embodiments provide that the $NO_x$ trap, the SCR catalyst, or both are integrated into a housing with the catalyzed particulate trap. An OBD system advises the operator of a vehicle when gaseous pollutants or emissions produced by such vehicles exceed regulatory standards. OBD systems rely on a gas sensor or the like, such as an exhaust gas oxygen sensor (EGO) or a hydrocarbon sensor, for monitoring the exhaust. U.S. Pat. No. 5,941,918 (Blosser), incorporated herein by reference, provides an exemplary OBD system.

A detailed embodiment provides that an inlet side or an outlet side of the particulate trap is coated with a washcoat comprising palladium, a support, and an oxygen storage component. A further detailed embodiment provides that an inlet side or an outlet side of the particulate trap is coated with a washcoat comprising rhodium, a support, and an oxygen storage component. Another detailed embodiment provides that both an inlet side and an outlet side of the particulate trap are coated with a washcoat comprising a precious metal component selected from palladium, platinum, or both; a support; and an oxygen storage component.

A further aspect provides methods of treating a gas comprising hydrocarbons, carbon monoxide, nitrogen oxides, and particulates, the method comprising: locating an emissions treatment system downstream of a gasoline direct injection engine; providing a three-way conversion (TWC) catalyst and a particulate trap in the emissions treatment system; and contacting exhaust gas from the engine with the TWC catalyst and the particulate trap. One embodiment provides that the method further comprises providing a $NO_x$ trap, an SCR catalyst, or both downstream of the catalyzed particulate trap. In an embodiment, the step of providing the three-way conversion (TWC) catalyst and the particulate trap comprises depositing the catalyst on the particulate trap to form a catalyzed particulate trap. In another embodiment, the method further comprises coating an inlet side or an outlet side of the particulate trap with a washcoat comprising palladium, a support, and an oxygen storage component. Another embodiment provides coating an inlet side or an outlet side of the particulate trap with a washcoat comprising rhodium, a support, and an oxygen storage component. In a detailed embodiment, the method further comprises depositing the catalyst in an amount of no more than 2 g/in$^3$ total on an inlet side and an outlet side. A further embodiment provides providing a second three-way conversion catalyst upstream of the catalyzed particulate trap.

Before describing several exemplary embodiments of the invention, it is to be understood that the invention is not limited to the details of construction or process steps set forth in the following description. The invention is capable of other embodiments and of being practiced or being carried out in various ways.

Turning to FIG. 1A, an exhaust gas stream containing gaseous pollutants (e.g., unburned hydrocarbons, carbon monoxide, nitrogen oxides) and particulate matter is conveyed via line 6 from a gasoline engine 4 to a three-way conversion (TWC) catalyst 8. In the TWC catalyst 8, unburned gaseous and non-volatile hydrocarbons (i.e., the VOF) and carbon monoxide are largely combusted to form carbon dioxide and water. In addition, nitrogen oxides are reduced to form nitrogen and water. Removal of substantial proportions of the VOF using the oxidation catalyst, in particular, helps to prevent too great a deposition of particulate matter (i.e., clogging) on the particulate filter (also referred to as a soot filter) 12, which is positioned downstream in the emission treatment system. The exhaust stream is next conveyed via line 10 to a particulate filter 12, which traps particulate matter and/or catalyst poisons present within the exhaust gas stream. Optionally, the particulate filter can be catalyzed with a soot burning catalyst for regeneration of the particulate filter 12. In an embodiment when the particulate filter is not otherwise coated, the TWC can be coated onto the particulate filter.

After removal of particulate matter, via the particulate filter 12, the exhaust gas stream is optionally conveyed, depending on the needs of the automobile operating system, via line 14 to a downstream $NO_x$ trap 16 for adsorbing any remaining $NO_x$ emission contaminants in the exhaust gas stream. From the $NO_x$ trap 16 through line 18, an SCR catalyst 20 can be located to receive the outlet of the $NO_x$ trap to provide further emissions treatment of any ammonia generated by the $NO_x$ trap with a selective catalytic reduction catalyst for reducing oxides of nitrogen to form nitrogen and water. Line 22 leads to the tail pipe and out of the system.

In FIG. 1B, an emissions treatment system 3 comprises a gasoline engine 5 that conveys exhaust through line 7 to a first TWC catalyst 9, which in some instances can be smaller than otherwise needed because of the downstream TWC-coated particulate filter 13, which receives the exhaust stream through line 11. Line 15 can lead to further treatment components and/or to the tail pipe and out of the system. In other instances, TWC-coated particulate filter 13 contains a TWC catalyst loading that is designed to work in conjunction with the first TWC catalyst in order to meet emission requirements.

In FIG. 1C, an emissions treatment system 100 comprises a gasoline engine 102 that conveys exhaust through line 103, where a first manifold 104 directs the exhaust to a TWC-coated particulate filter 110 during cold start conditions. An optional TWC catalyst is located upstream of the TWC-coated particulate filter. Once such cold start conditions are over and substantially steady state conditions have begun, the exhaust can be routed to a second manifold 108 so that the TWC catalyst 106 can be used without the backpressure loss associated with the TWC-coated filter 110. Line 112 leads to further treatment components such as NOx trap and SCR catalyst and/or to the tail pipe and out of the system.

Figure 2:
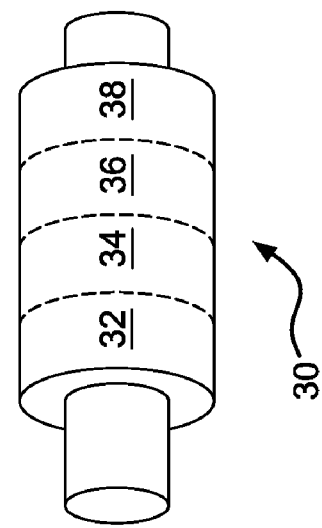
FIG. 2 is a schematic view showing an integrated engine emission treatment system according to an embodiment.

Turning to FIG. 2, an integrated emission treatment system 30 comprises a TWC catalyst section 32, a particulate filter section 34, an optional $NO_x$ trap 36 and SCR 38. During the treatment of an exhaust gas emission stream the exhaust gas flows from an engine through the integrated emission treatment system 30 for the treatment and/or conversion of exhaust gas emission contaminants such as unburned hydrocarbons (HC), carbon monoxide (CO), nitrogen oxides ($NO_x$), and particulate matter. The exhaust gas flows sequentially through the upstream TWC catalyst section 32, a particulate filter section 34, an optional $NO_x$ trap 36 and SCR catalyst 38. In this integrated system, the TWC catalyst 32 can be coated onto the particulate filter 34, thereby eliminating a section.

With regard to formation of TWC catalyst and oxidation catalysts, TWC catalysts that exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The refractory metal oxide supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith). TWC catalysts can also be formulated to include an oxygen storage component.

As for an oxidation catalyst, a typical washcoat may contain base metal catalytic agents, platinum group metal catalytic agents or combinations of both that are supported on refractory metal oxides, e.g., activated alumina. Base metal catalytic agents may include rare earth metal oxides, particularly lanthanum oxide, cerium oxide and praseodymium oxide. Specific platinum group metal catalytic agents may include platinum, palladium, rhodium and combinations thereof. Useful refractory metal oxides may include silica, alumina, gamma-alumina, titania, zirconia, silica-alumina and ceria-zirconia. Optionally, the catalytic washcoat composition also may contain other additives such as promoters and stabilizers. Molecular sieves such as zeolites may also be useful in the oxidation catalyst.

Reference to a "support" in a catalyst washcoat layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. High surface refractory metal oxide supports refer to support particles having pores larger than 20 Å and a wide pore distribution. As defined herein, such metal oxide supports exclude molecular sieves, specifically, zeolites. High surface area refractory metal oxide supports, e.g., alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption.

One or more embodiments include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia, ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

Reference to oxygen storage component (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the washcoat layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

As used herein, molecular sieves, such as zeolites, refer to materials, which may in particulate form support catalytic precious group metals, the materials having a substantially uniform pore distribution, with the average pore size being no larger than 20 Å. Reference to a "non-zeolite-support" in a catalyst washcoat layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides.

Reference to "impregnated" means that a precious metal-containing solution is put into pores of a support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the support. Reference to "intimate contact" includes having an effective amount of components in such contact (for example, Pd and OSC) on the same support, in direct contact, and/or in substantial proximity such that the OSC contacts oxygen components before the Pd component.

Particulate Trap

Reference to particulate trap means a filter so sized and configured to trap particulates generated by the combustion reactions in the direct injection gasoline engine. Trapping of particulates can occur, for example, by use of a particulate (or soot) filter, by use of a flow-through substrate having an internal tortuous path such that a change in direction of flow of the particulates causes them to drop out of the exhaust stream, by use of a metallic substrate, such as a corrugated metal carrier, or by other methods known to those skilled in the art. Other filtration devices may be suitable, such as a pipe with a roughened surface that can knock particles out of the exhaust stream. A pipe with a bend may also be suitable.

Figure 3:
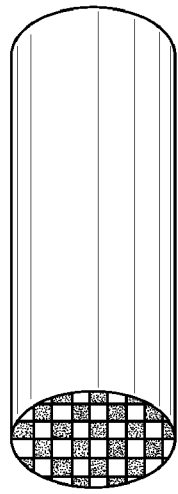
FIG. 3 is a perspective view of a wall flow filter substrate.

With reference to filters, FIG. 3 depicts a perspective view of an exemplary wall flow filter substrate suitable for a particulate filter. Wall flow substrates useful for supporting the TWC or oxidation catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 300 flow passages (or "cells") per square inch of cross section, although far fewer may be used. For example, the carrier may have from about 7 to 300, more usually from about 200 to 300, cells per square inch ("cpsi"). The cells can have cross sections that are rectangular, square, circular, oval, triangular, hexagonal, or are of other polygonal shapes. Wall flow substrates typically have a wall thickness between 0.008 and 0.016 inches. Specific wall flow substrates have a wall thickness of between 0.010 and 0.012 inches.

Figure 4:
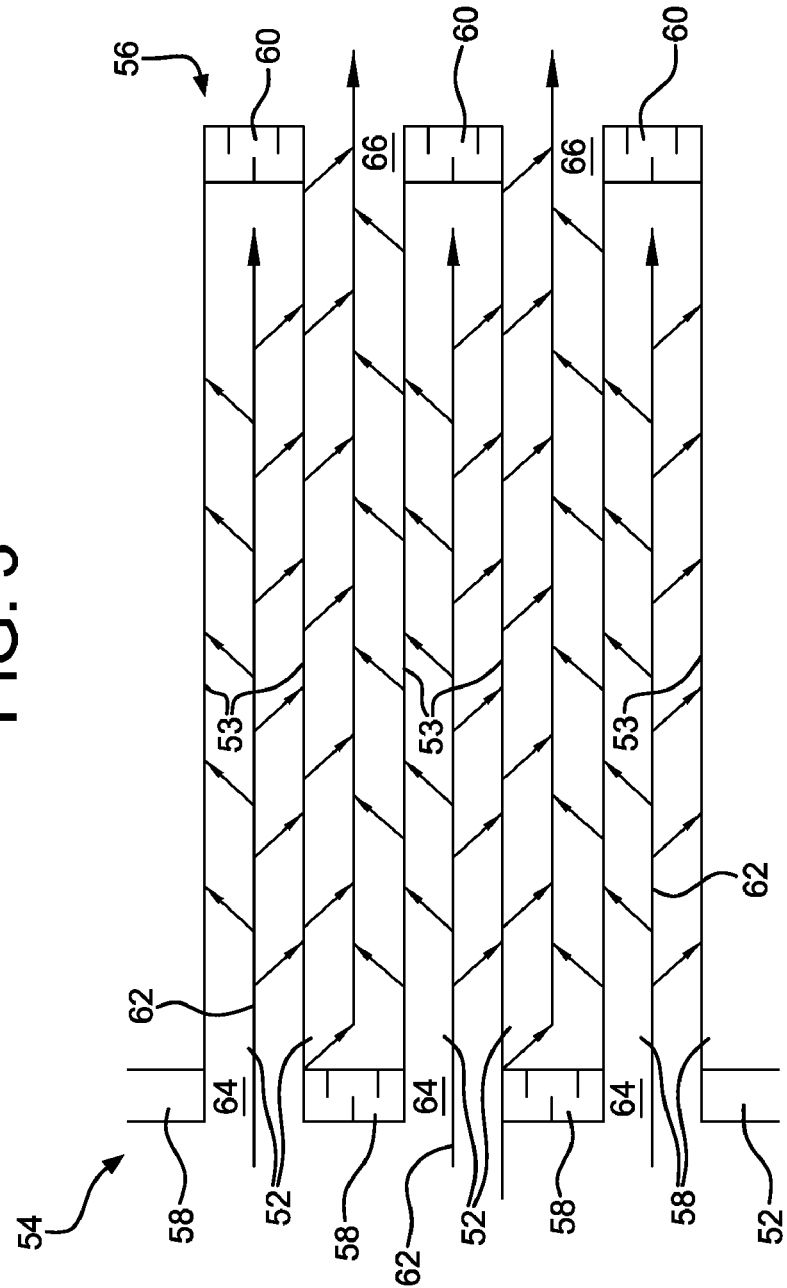
FIG. 4 is a cut-away view of a section of a wall flow filter substrate.
Figure 5:
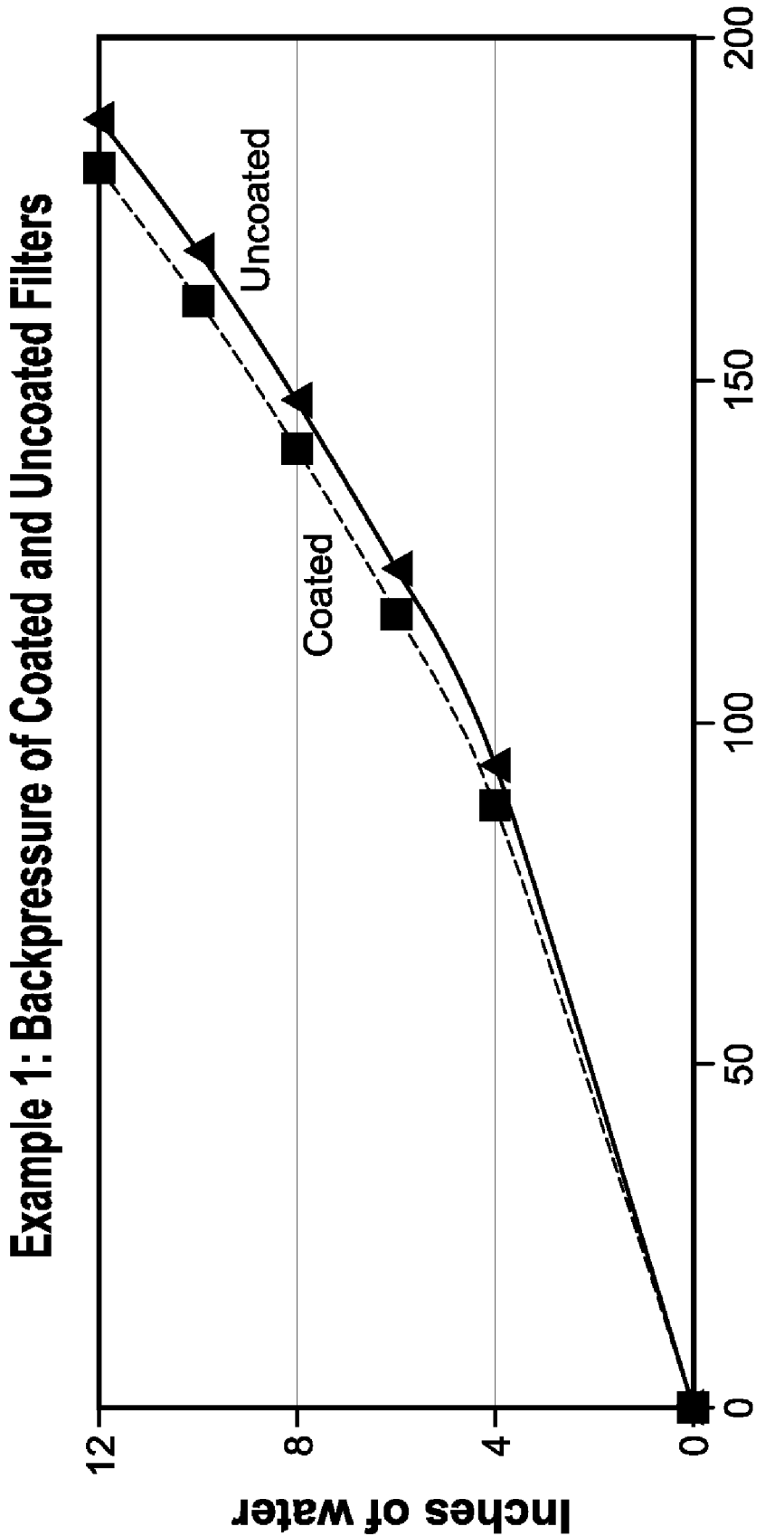
FIG. 5 shows pressure drop data for an exemplary coated soot filter.
Figure 6:
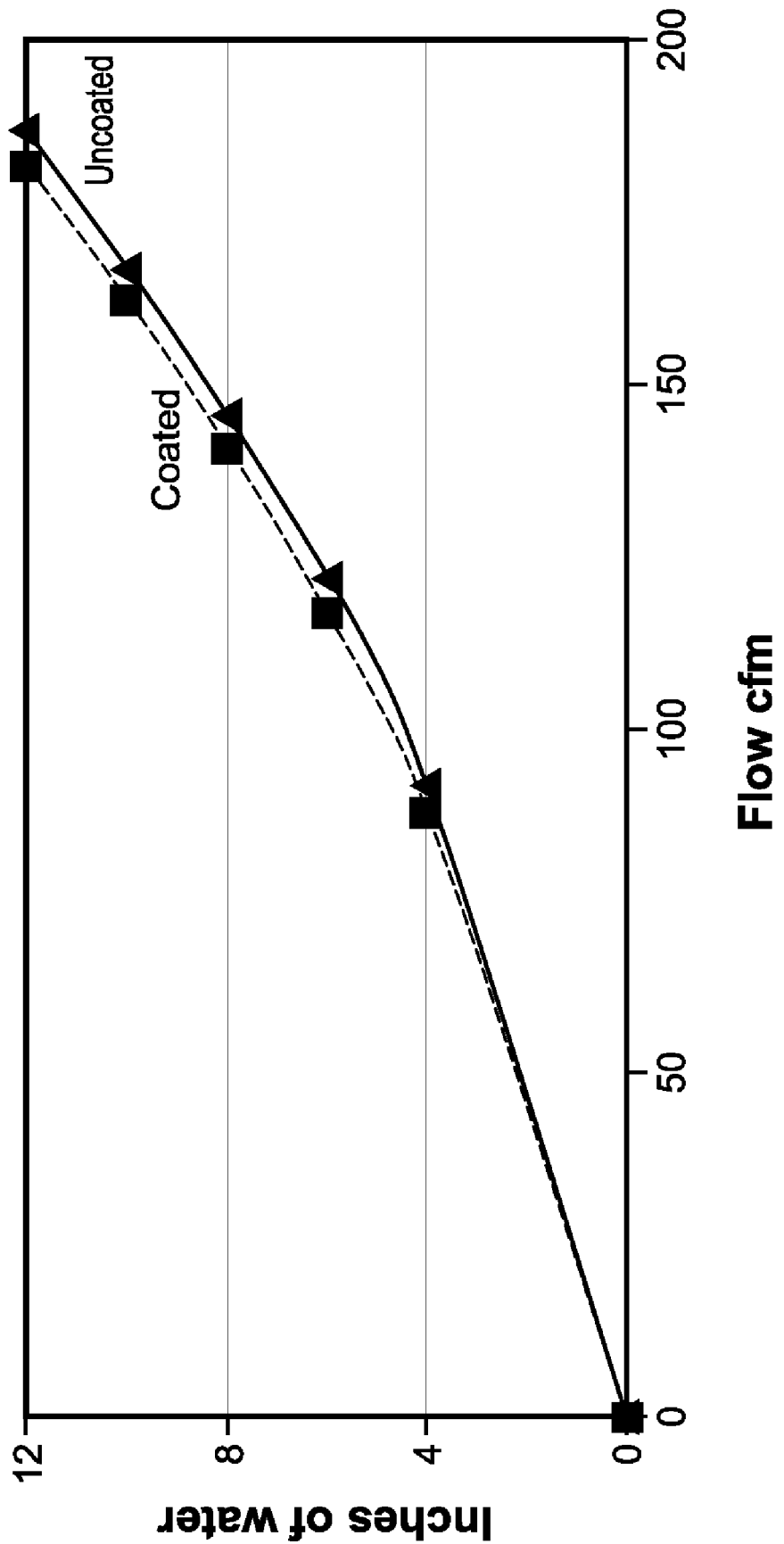
FIG. 6 shows pressure drop data for an exemplary coated soot filter.
Figure 7:
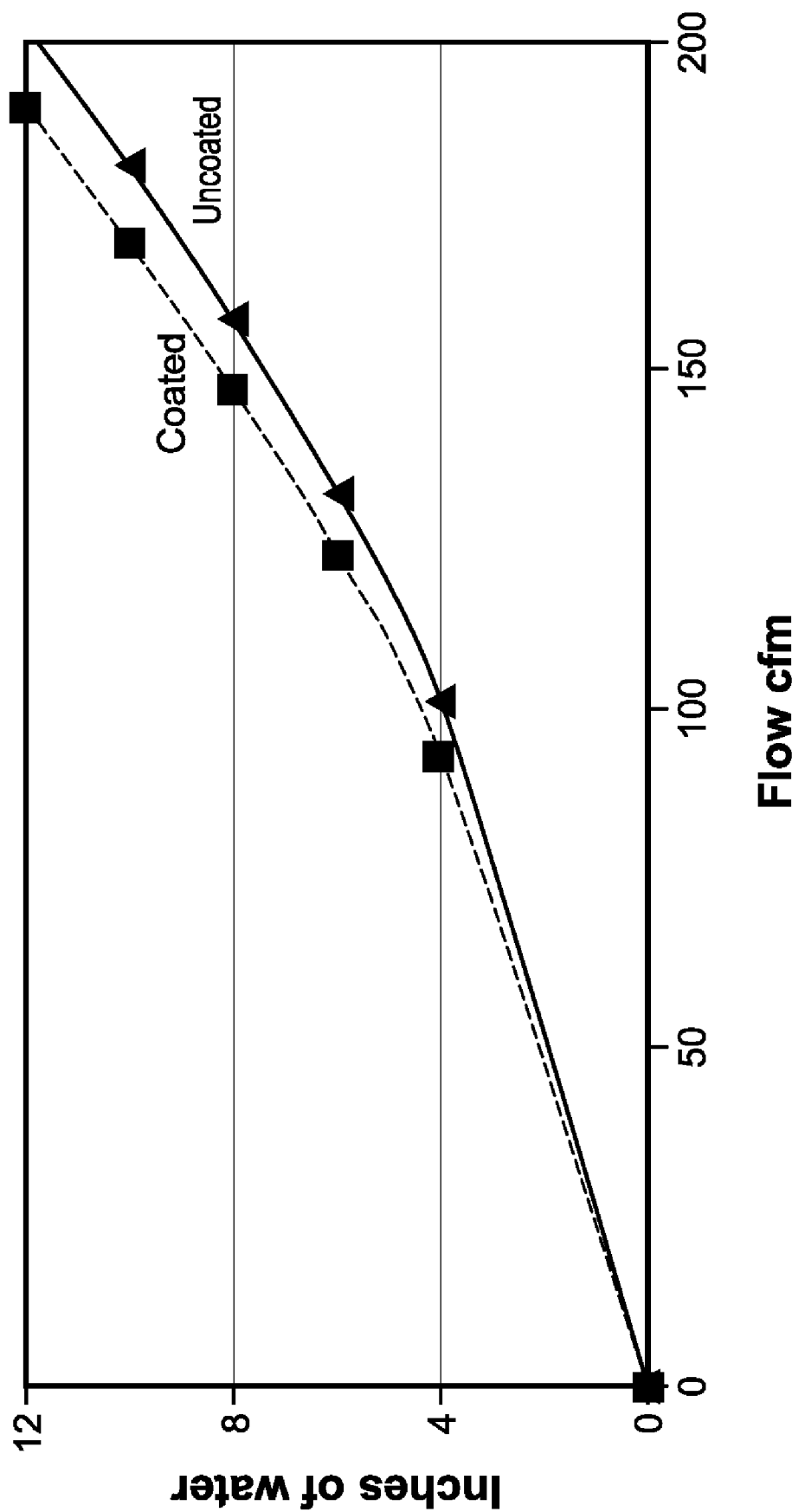
FIG. 7 shows pressure drop data for an exemplary coated soot filter.
Figure 8:
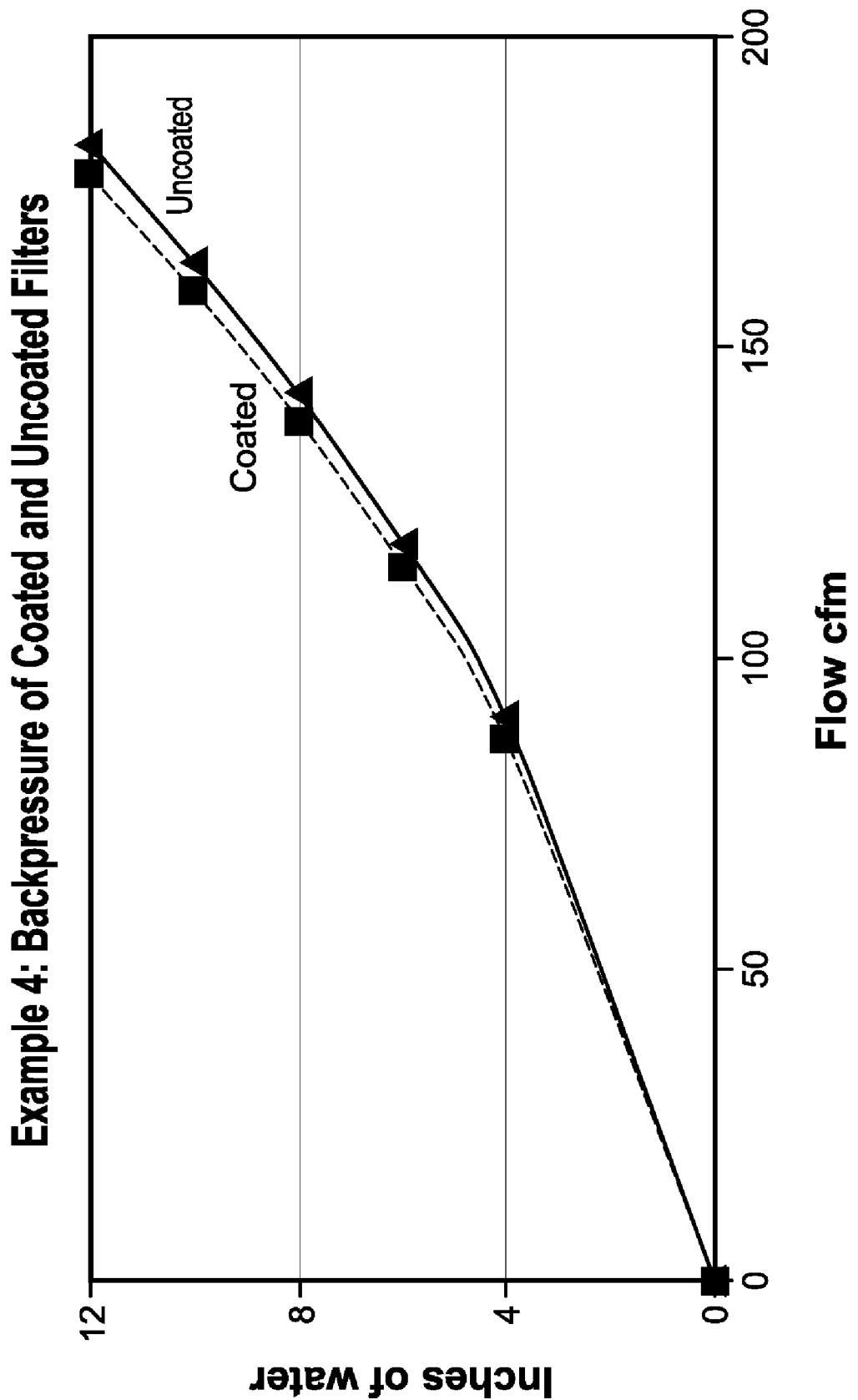
FIG. 8 shows pressure drop data for an exemplary coated soot filter.

FIGS. 3 and 4 illustrate a wall flow filter substrate 50 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Wall flow filter substrates can be composed of ceramic-like materials such as cordierite, α-alumina, silicon carbide, aluminum titanate, silicon nitride, zirconia, mullite, spodumene, alumina-silica-magnesia or zirconium silicate, or of porous, refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity of at least 50% (e.g., from 50 to 75%) having a mean pore size of at least 5 microns (e.g., from 5 to 30 microns). In a specific embodiment, the substrates can have a porosity of at least 59% and have a mean pore size of between 10 and 20 microns. When substrates with these porosities and these mean pore sizes are coated with the techniques described below, adequate levels of TWC or oxidation catalyst compositions can be loaded onto the substrates to achieve excellent hydrocarbon, CO, and/or $NO_x$ conversion efficiency. These substrates are still able retain adequate exhaust flow characteristics, i.e., acceptable back pressures, despite the catalyst loading. U.S. Pat. No. 4,329,162 is herein incorporated by reference with respect to the disclosure of suitable wall flow substrates.

Typical wall flow filters in commercial use are typically formed with lower wall porosities, e.g., from about 42% to 50%, than the wall flow filters utilized in the invention. In general, the pore size distribution of commercial wall flow filters is typically very broad with a mean pore size smaller than 25 microns.

The porous wall flow filter used in this invention is catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

To coat the wall flow filters with the TWC or oxidation catalyst composition, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The filter is removed from the slurry, and excess slurry is removed from the wall flow filter first by allowing it to drain from the channels, then by blowing with compressed air (against the direction of slurry penetration), and then by pulling a vacuum from the direction of slurry penetration. By using this technique, the catalyst slurry permeates the walls of the filter, yet the pores are not occluded to the extent that undue back pressure will build up in the finished filter. As used herein, the term "permeate" when used to describe the dispersion of the catalyst slurry on the filter, means that the catalyst composition is dispersed throughout the wall of the filter.

The coated filters are dried typically at about 100° C. and calcined at a higher temperature (e.g., 300 to 450° C. and up to 550° C.). After calcining, the catalyst loading can be determined through calculation of the coated and uncoated weights of the filter. As will be apparent to those of skill in the art, the catalyst loading can be modified by altering the solids content of the coating slurry. Alternatively, repeated immersions of the filter in the coating slurry can be conducted, followed by removal of the excess slurry as described above.

With reference to a metallic substrate, a useful substrate may be composed of one or more metals or metal alloys. The metallic carriers may be employed in various shapes such as corrugated sheet or monolithic form. Specific metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance adherence of a catalytic material to the carrier.

Preparation of Catalyst Composite Washcoats

The catalyst composites may be formed in a single layer or multiple layers. In some instances, it may be suitable to prepare one slurry of catalytic material and use this slurry to form multiple layers on the carrier. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated. A "washcoat layer," therefore, is defined as a coating that is comprised of support particles. A "catalyzed washcoat layer" is a coating comprised of support particles impregnated with catalytic components.

The catalyst composite can be readily prepared in layers on a carrier. For a first layer of a specific washcoat, finely divided particles of a high surface area refractory metal oxide such as gamma alumina are slurried in an appropriate vehicle, e.g., water. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Typically, when palladium is desired, the palladium component is utilized in the form of a compound or complex to achieve dispersion of the component on the refractory metal oxide support, e.g., activated alumina. The term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

$NO_x$ Traps

Despite the presence of the TWC catalyst, the use of a gasoline direct injection engine results in lean burn conditions where $NO_x$ levels are higher than during conventional stoichiometric conditions of gasoline engines. As a result, the TWC catalyst may not reduce all of the $NO_x$ components. A $NO_x$ trap contains at least a $NO_x$ sorbent and a catalyst for reducing $NO_x$. Generally, a $NO_x$ sorbent stores $NO_x$ during periods of lean (oxygen-rich) operation, and releases the stored $NO_x$ during the rich (relatively fuel-rich) periods of operation. During periods of rich operation, a catalyst component of the $NO_x$ trap promotes the reduction of $NO_x$ to nitrogen by reaction of $NO_x$ (including $NO_x$ released from the $NO_x$ sorbent) with HC, CO, and/or hydrogen present in the exhaust. $NO_x$ sorbent components can be selected from the group consisting of alkaline earth metal components, alkali metal components, and rare earth metal components. In specific embodiments, the $NO_x$ sorbent component is selected from the group consisting of oxides of calcium, strontium, and barium, oxides of potassium, sodium, lithium, and cesium, and oxides of cerium, lanthanum, praseodymium, and neodymium. When over reduction of $NO_x$ by reaction with $H_2$ and/or hydrocarbons occurs in the $NO_x$ trap, ammonia $NH_3$ can be produced, which requires additional treatment.

SCR Catalysts

Treatment of $NH_3$ can also be achieved by the use of Selective Catalytic Reduction (SCR). In SCR, ammonia or urea-based reagents are used in the presence of a catalyst having a base metal where the ammonia reacts to reduce the oxides of nitrogen. Ammonia or urea can be injected into the exhaust system in front of the SCR catalyst or produced on the $NO_x$ trap catalyst due to the over reduction of the stored $NO_x$. Suitable SCR catalyst compositions are described, for instance, in U.S. Pat. No. 4,961,917 (Byrne) and U.S. Pat. No. 5,516,497 (Speronello), which are both hereby incorporated by reference in their entirety. Compositions disclosed in the Byrne patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Before describing several exemplary embodiments of the invention, it is to be understood that the invention is not limited to the details of construction or process steps set forth in the following description. The invention is capable of other embodiments and of being practiced in various ways. In the following, preferred designs for the layered catalyst are provided, including such combinations as recited used alone or in unlimited combinations, the uses for which include systems and methods of other aspects of the present invention.

In embodiment 1, provided is an emission treatment system downstream of a gasoline direct injection engine for treatment of an exhaust system comprising hydrocarbons, carbon monoxide, nitrogen oxides, and particulates, the emission treatment system comprising a catalyzed particulate trap comprising a three-way conversion (TWC) catalyst coated onto or within a particulate trap.

In embodiment 2, provided is an emission treatment system downstream of a gasoline direct injection engine for treatment of an exhaust system comprising hydrocarbons, carbon monoxide, nitrogen oxides, and particulates, the emission treatment system comprising a catalyzed particulate trap having an oxidation catalyst or a three-way conversion catalyst deposited thereon; one or more gas sensors, and an on-board diagnostic (OBD) system.

In embodiment 3, provided is a method of treating an exhaust gas comprising hydrocarbons, carbon monoxide, nitrogen oxides, and particulates, the method comprising: locating an emissions treatment system downstream of a gasoline direct injection engine; providing a catalyzed particulate trap that comprises a three-way conversion (TWC) catalyst deposited on a particulate trap in the emissions treatment system; and contacting exhaust gas from the engine with the catalyzed particulate trap.

Any of embodiments 1 to 3 can have one or more of the following optional design features:

the particulate trap comprises a soot filter;

a $NO_x$ trap, an SCR catalyst, or both are located downstream of the catalyzed particulate trap;

the three-way conversion catalyst composition is coated within an inlet side, an outlet side, or both of the particulate trap;

the inlet side or the outlet side is coated with a washcoat comprising palladium, a support, and an oxygen storage component;

the oxygen storage component is present in an amount of up to 10% by weight of the washcoat;

the inlet side or the outlet side is coated with a washcoat comprising rhodium, a support, and an oxygen storage component;

the oxygen storage component is present in an amount of 10 to 25% by weight of the washcoat;

an inlet side of the particulate trap comprises a layer of the three-way conversion catalyst thereon that has a thickness in the range of 10 to 50 microns;

50% or more of an overall platinum group metal (PGM) loading is deposited on an upstream 20-50% axial distance of the filter, and 50% or less of the overall PGM loading is deposited on a rear 50-80% axial distance of the filter;

the catalyst is present in an amount of no more than 2 $g/in^3$ total on an inlet side and an outlet side.

a second three-way conversion catalyst is provided upstream of the catalyzed particulate trap.

the catalyzed particulate trap is contacted during cold start conditions and the catalyzed particulate trap is bypassed after cold start conditions.

EXAMPLES

The following non-limiting examples shall serve to illustrate the various embodiments of the present invention. In each of the examples, the carrier was cordierite. Reference to a first coat and a second coat provides no limitation on the location or orientation of the coat. With reference to inlet coat, this means the exhaust gas first contacts the inlet coat before contacting the outlet coat.

Example 1

A soot filter having a catalytic material was prepared using two coats: an inlet coat and an outlet coat. The three-way conversion (TWC) catalyst composite contained palladium and rhodium with a total precious metal loading of 26 $g/ft^3$ and with a Pt/Pd/Rh ratio of 0/24.5/1.5. The substrate had a volume of 91.5 $in^3$ (1.5 L), a cell density of 600 cells per square inch, a wall thickness of approximately 100 μm, and a porosity of 50%. The coats were prepared as follows:

Inlet Coat

The components present in the inlet coat were a lanthana-stabilized high surface area gamma alumina, a ceria-zirconia composite with 28% ceria by weight, rhodium, and barium oxide, at concentrations of approximately 29.3%, 58.5%, 0.5%, and 11.7%, respectively, based on the calcined weight of the catalyst. The barium oxide was introduced as a hydroxide solution. The total loading of the coat was 0.17 $g/in^3$. The OSC content in the coat was approximately 16%.

Rhodium in the form of a rhodium nitrate solution was impregnated by planetary mixer (P-mixer) onto the stabilized alumina to form a wet powder while achieving incipient wetness. An aqueous slurry was formed. The barium solution was added. The components were milled to a particle size of 90% being 8-10 microns. The ceria-zirconia composite was added and the components were further milled to a particle size of 90% being less than 5 microns. The slurry was coated onto the inlet side of the wall flow cordierite filter using deposition methods known in the art. After coating, the filter plus the inlet coat were dried.

Outlet Coat

The components present in the outlet coat were high surface area gamma alumina, lanthana-stabilized high surface area gamma alumina, a ceria-zirconia composite with 28% ceria by weight, palladium, zirconium oxide, barium oxide, strontium oxide, and lanthanum oxide, at concentrations of approximately 51.8%, 25.9%, 9.4%, 3.3%, 2.4%, 2.4%, 2.4% and 2.4%, respectively, based on the calcined weight of the catalyst. The total loading of the outlet coat was 0.42 $g/in^3$. The zirconium oxide and strontium oxide were introduced as acetate solutions. The barium oxide and lanthanum oxide were introduced as nitrate solutions. The OSC (oxygen storage component) content in the coat was approximately 3%.

An aqueous slurry was formed by combining the aluminas. Palladium in the form of a palladium nitrate solution was impregnated by planetary mixer (P-mixer) onto the aluminas to form a wet powder while achieving incipient wetness. Zirconium and barium solutions were added and the pH was adjusted to between 3 and 3.5. The components were milled to a particle size of 90% being 8-10 microns. The ceria-zirconia composite along with the lanthanum and strontium solutions were added and the components were further milled to a particle size of 90% being less than 5 microns. The slurry was coated onto the outlet side of a wall flow cordierite filter using deposition methods known in the art for depositing the catalyst onto a cordierite substrate. After coating, the filter plus the inlet and outlet coats were dried and then calcined at a temperature of 550° C. for about 1 hour.

Example 2

A soot filter having a catalytic material was prepared using two coats: an inlet coat and an outlet coat. The three-way conversion (TWC) catalyst composite contained palladium and rhodium with a total precious metal loading of 68 $g/ft^3$ and with a Pt/Pd/Rh ratio of 0/65.5/2.5. The substrate had a volume of 91.5 $in^3$ (1.5 L), a cell density of 600 cells per square inch, a wall thickness of approximately 100 μm, and a porosity of 50%. The coats were prepared as follows:

Inlet Coat

The components present in the inlet coat were a lanthana-stabilized high surface area gamma alumina, a ceria-zirconia composite with 28% ceria by weight, rhodium, and barium oxide, at concentrations of approximately 29.2%, 58.3%, 0.8%, and 11.7%, respectively, based on the calcined weight of the catalyst. The barium oxide was introduced as a hydroxide solution. The total loading of the coat was 0.17 $g/in^3$. The OSC content in the coat was approximately 16%.

Rhodium in the form of a rhodium nitrate solution was impregnated by planetary mixer (P-mixer) onto the stabilized alumina to form a wet powder while achieving incipient wetness. An aqueous slurry was formed. The barium solution was added. The components were milled to a particle size of 90% being 8-10 microns. The ceria-zirconia composite was added and the components were further milled to a particle size of 90% being less than 5 microns. The slurry was coated onto the inlet side of the wall flow cordierite filter using deposition methods known in the art. After coating, the filter plus the inlet coat were dried.

Outlet Coat

The components present in the outlet coat were high surface area gamma alumina, lanthana-stabilized high surface area gamma alumina, a ceria-zirconia composite with 28% ceria by weight, palladium, zirconium oxide, barium oxide, strontium oxide, and lanthanum oxide, at concentrations of approximately 49.2%, 24.6%, 8.9%, 8.4%, 2.2%, 2.2%, 2.2% and 2.2%, respectively, based on the calcined weight of the catalyst. The total loading of the outlet coat was 0.45 g/in$^3$. The zirconium oxide and strontium oxide were introduced as acetate solutions. The barium oxide and lanthanum oxide were introduced as nitrate solutions. The OSC (oxygen storage component) content in the coat was approximately 3%.

An aqueous slurry was formed by combining the aluminas. Palladium in the form of a palladium nitrate solution was impregnated by planetary mixer (P-mixer) onto the aluminas to form a wet powder while achieving incipient wetness. Zirconium and barium solutions were added and the pH was adjusted to between 3 and 3.5. The components were milled to a particle size of 90% being 8-10 microns. The ceria-zirconia composite along with the lanthanum and strontium solutions were added and the components were further milled to a particle size of 90% being less than 5 microns. The slurry was coated onto the outlet side of a wall flow cordierite filter using deposition methods known in the art for depositing the catalyst onto a cordierite substrate. After coating, the filter plus the inlet and outlet coats were dried and then calcined at a temperature of 550° C. for about 1 hour.

Example 3

A soot filter having a catalytic material was prepared using two coats: an inlet coat and an outlet coat. The three-way conversion (TWC) catalyst composite contained palladium and rhodium with a total precious metal loading of 61 g/ft$^3$ and with a Pt/Pd/Rh ratio of 0/58.6/2.4. The substrate had a volume of 91.5 in$^3$ (1.5 L), a cell density of 600 cells per square inch, a wall thickness of approximately 100 μm, and a porosity of 59%. The coats were prepared as follows:

Inlet Coat

The components present in the inlet coat were a lanthana-stabilized high surface area gamma alumina, a ceria-zirconia composite with 28% ceria by weight, rhodium, and barium oxide, at concentrations of approximately 31.2%, 62.2%, 0.4%, and 6.2%, respectively, based on the calcined weight of the catalyst. The barium oxide was introduced as a hydroxide solution. The total loading of the coat was 0.32 g/in$^3$. The OSC content in the coat was approximately 17%.

Rhodium in the form of a rhodium nitrate solution was impregnated by planetary mixer (P-mixer) onto the stabilized alumina to form a wet powder while achieving incipient wetness. An aqueous slurry was formed. The barium solution was added. The components were milled to a particle size of 90% being 8-10 microns. The ceria-zirconia composite was added and the components were further milled to a particle size of 90% being less than 5 microns. The slurry was coated onto the inlet side of the wall flow cordierite filter using deposition methods known in the art. After coating, the filter plus the inlet coat were dried.

Outlet Coat

The components present in the outlet coat were high surface area gamma alumina, lanthana-stabilized high surface area gamma alumina, a ceria-zirconia composite with 28% ceria by weight, palladium, zirconium oxide, barium oxide, strontium oxide, and lanthanum oxide, at concentrations of approximately 50.2%, 25.1%, 12.1%, 5.1%, 1.5%, 1.5%, 1.5% and 3.0%, respectively, based on the calcined weight of the catalyst. The total loading of the outlet coat was 0.66 g/in$^3$. The zirconium oxide and strontium oxide were introduced as acetate solutions. The barium oxide and lanthanum oxide were introduced as nitrate solutions. The OSC (oxygen storage component) content in the coat was approximately 3%.

An aqueous slurry was formed by combining the aluminas. Palladium in the form of a palladium nitrate solution was impregnated by planetary mixer (P-mixer) onto the aluminas to form a wet powder while achieving incipient wetness. Zirconium and barium solutions were added and the pH was adjusted to between 3 and 3.5. The components were milled to a particle size of 90% being 8-10 microns. The ceria-zirconia composite along with the lanthanum and strontium solutions were added and the components were further milled to a particle size of 90% being less than 5 microns. The slurry was coated onto the outlet side of a wall flow cordierite filter using deposition methods known in the art for depositing the catalyst onto a cordierite substrate. After coating, the filter plus the inlet and outlet coats were dried and then calcined at a temperature of 550° C. for about 1 hour.

Example 4

A soot filter having a catalytic material was prepared using two coats: an inlet coat and an outlet coat. The oxidation catalyst composite contained platinum and palladium with a total precious metal loading of 37.5 g/ft$^3$ and with a Pt/Pd/Rh ratio of 25/12.5/0. The substrate had a volume of 91.5 in$^3$ (1.5 L), a cell density of 600 cells per square inch, a wall thickness of approximately 100 μm, and a porosity of 50%. The coats were prepared as follows:

Inlet Coat

The components present in the inlet coat were lanthana-stabilized high surface area gamma alumina, a ceria-zirconia composite with 28% ceria by weight, platinum, palladium, and zirconium oxide, at concentrations of approximately 55.2%, 31.5%, 3.6%, 1.8%, and 7.9%, respectively, based on the calcined weight of the catalyst. The total loading of the inlet coat was 0.64 g/in$^3$. The zirconium oxide was introduced as an acetate solution. The OSC (oxygen storage component) content in the coat was approximately 9%. The metal loading of the inlet coat was 60 g/ft$^3$ total.

Palladium in the form of a palladium nitrate solution and platinum in the form of an amine was impregnated by planetary mixer (P-mixer) onto the alumina in an aqueous solution to form a wet powder while achieving incipient wetness. The zirconium solution was added and the pH was adjusted to between 3 and 3.5. The components were milled to a particle size of 90% being 8-10 microns. The ceria-zirconia composite was added and the components were further milled to a particle size of 90% being less than 5 microns. The slurry was coated onto the inlet side of a wall flow cordierite filter for a distance of 50% of the axial length using deposition methods known in the art for depositing the catalyst onto a cordierite substrate. After coating, the filter plus the inlet coat were dried and then calcined at a temperature of 550° C. for about 1 hour.

Outlet Coat

The components present in the outlet coat were lanthana-stabilized high surface area gamma alumina, a ceria-zirconia composite with 28% ceria by weight, platinum, palladium, and zirconium oxide, at concentrations of approximately 57.5%, 32.8%, 1.0%, 0.5%, and 8.2%, respectively, based on the calcined weight of the catalyst. The total loading of the inlet coat was 0.61 g/in$^3$. The zirconium oxide was introduced as an acetate solution. The OSC (oxygen storage component) content in the coat was approximately 9%. The metal loading of the outlet coat was 15 g/ft$^3$ total.

Palladium in the form of a palladium nitrate solution and platinum in the form of an amine was impregnated by planetary mixer (P-mixer) onto the alumina in an aqueous solution to form a wet powder while achieving incipient wetness. The zirconium solution was added and the pH was adjusted to between 3 and 3.5. The components were milled to a particle size of 90% being 8-10 microns. The ceria-zirconia composite was added and the components were further milled to a particle size of 90% being less than 5 microns. The slurry was coated onto the outlet side of the wall flow cordierite filter for a distance of 50% of the axial length using deposition methods known in the art. After coating, the filter plus the inlet and outlet coats were dried and then calcined at a temperature of 550° C. for about 1 hour.

Example 5

Testing

The soot filters of Examples 1, 2, 3, and 4 were tested to determine their contribution to backpressure. The pressure drop of the filters with the coatings compared with blank filters was not significantly increased. Results of pressure drop in inches of water relative to flow (cfm) of Examples 1, 2, 3, and 4 are provided in FIGS. 5, 6, 7, and 8, respectively.

Example 6

Comparative

A flow-through monolith having an undercoat in conjunction with the two-layered catalytic material of EXAMPLE 2 was prepared. The flow-through monolith had a volume of 91.5 in$^3$ (1.5 L), a cell density of 600 cells per square inch, and a wall thickness of approximately 100 μm. The undercoat contained activated gamma alumina, zirconia, and a binder. Bottom and top washcoat layers were prepared as described in EXAMPLE 2 for the inlet and outlet coats, respectively.

Example 7

Comparative

A flow-through monolith having an undercoat in conjunction with the two-layered catalytic material of EXAMPLE 3 was prepared. The flow-through monolith had a volume of 91.5 in$^3$ (1.5 L), a cell density of 600 cells per square inch, and a wall thickness of approximately 100 μm. The undercoat contained activated gamma alumina, zirconia, and a binder. Bottom and top washcoat layers were prepared as described in EXAMPLE 3 for the inlet and outlet coats, respectively.

Example 8

Comparative

A flow-through monolith having an undercoat in conjunction with a layer of catalytic material was prepared. The undercoat contained activated gamma alumina, zirconia, and a binder. The catalytic material contained platinum and palladium with a total precious metal loading of 60 g/ft$^3$ and with a Pt/Pd ratio of 2/1. The flow-through monolith had a volume of 91.5 in$^3$ (1.5 L), a cell density of 600 cells per square inch, and a wall thickness of approximately 100 μm. The catalytic material washcoat layer was prepared as described in EXAMPLE 4 for the inlet coat.

Example 9

Comparative

A flow-through monolith having the two-layered catalytic material of EXAMPLE 3 was prepared (no undercoat). The flow-through monolith had a volume of 91.5 in$^3$ (1.5 L), a cell density of 600 cells per square inch, and a wall thickness of approximately 100 μm. Bottom and top washcoat layers were prepared as described in EXAMPLE 3 for the inlet and outlet coats, respectively.

Example 10

Testing

Core samples having dimensions of 1"×3" (2.5 cm×7.6 cm) from the catalyst composites of Examples 2-4 and 6-9 were aged at 900° C. in air for 5 hours. After aging, the composites are evaluated using a gasoline vehicle simulator where feed hydrocarbons (C1) contained 7.5% ethane, 40% propylene, 22.5% pentane, and 30% benzene with various test protocols, including OBD delay time, model lambda transients, and simulated MVEG drive cycles.

HC/CO/NO$_x$ conversions were measured while the temperature was rapidly raised to 500° C. Hydrocarbon, CO, and NO$_x$ concentrations are measured using a Fourier Transform Infrared (FTIR) analyzer. Table 1 provides residual percentages of HC, CO, and NOx.

TABLE 1

| Example | Substrate | PM Loading g/ft$^3$ | Residual % | | |
|---|---|---|---|---|---|
| | | | HC | CO | NOx |
| 2 | Soot filter 50% porosity | 68 | 2.3 | 7.3 | 15.3 |
| 3 | Soot filter 59% porosity | 61 | 1.8 | 5.4 | 12.4 |
| 4 | Soot filter 50% porosity | 37.5 | 6.1 | 13.5 | 19.6 |
| 6 Comparative | Flow-through w/undercoat | 68 | 2.1 | 5.9 | 16.5 |
| 7 Comparative | Flow-through w/undercoat | 61 | 2.0 | 4.8 | 10.3 |
| 8 Comparative | Flow-through w/undercoat | 37.5 | 5.4 | 15.0 | 18.5 |
| 9 Comparative | Flow-through | 61 | 1.8 | 4.6 | 9.2 |

Based on Table 1, it is concluded that the catalyzed soot filters of Examples 2-4 provide comparable conversions to the catalytic material on flow-through monoliths of Comparative Examples 6-9. In this way, the catalyzed soot filters of Examples 2-4 could be used as replacements for catalyzed flow-through monoliths in emissions systems requiring particulate trapping. To the extent that there are statistically significant differences in NOx performance between the soot filters and flow-through monoliths, downstream NOx traps and SCR catalysts typically found in lean GDI systems would be available to compensate as needed for NOx treatment. In summary, the use of a soot filter containing a desired precious metal loading provides comparable HC, CO, and NOx emissions treatment to flow-through monolith, with the additional benefit of particulate trapping.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An emission treatment system downstream of a gasoline direct injection engine for treatment of an exhaust system comprising hydrocarbons, carbon monoxide, nitrogen oxides, and particulates, the emission treatment system comprising a catalyzed particulate trap having a three-way conversion catalyst comprising an oxygen storage component deposited thereon; one or more gas sensors, and an on-board diagnostic (OBD) system;
wherein an inlet side of the particulate trap comprises a layer of the three-way conversion catalyst thereon that has a thickness in the range of 10 to 50 microns.

2. The emission treatment system of claim 1, wherein an inlet side or an outlet side of the particulate trap is coated with a washcoat comprising palladium, a support, and an oxygen storage component.

3. The emission treatment system of claim 2, wherein the oxygen storage component is present in an amount of up to 10% by weight of the wash coat.

4. The emission treatment system of claim 1, wherein an inlet side or an outlet side of the particulate trap is coated with a washcoat comprising rhodium, a support, and an oxygen storage component.

5. The emission treatment system of claim 4, wherein the oxygen storage component is present in an amount of 10 to 25% by weight of the wash coat.

6. The emission treatment system of claim 1, wherein both an inlet side and an outlet side of the particulate trap are coated with a washcoat comprising a precious metal component selected from palladium, platinum, or both; a support; and an oxygen storage component.

7. The emission treatment system of claim 1 further comprising a NOx trap, an SCR catalyst, or both located downstream of the catalyzed particulate trap.

8. The emissions treatment system of claim 1, wherein 50% or more of an overall platinum group metal (PGM) loading is deposited on an upstream 20-50% axial distance of the filter, and 50% or less of the overall PGM loading is deposited on a rear 50-80% axial distance of the filter.

9. The emissions treatment system of claim 1, wherein the catalyzed particulate trap comprises a catalyzed particulate filter having a porosity in the range of 50% to 59%.

10. The emissions treatment system of claim 1, wherein the catalyzed particulate trap comprises a catalyzed particulate filter that exhibits emissions conversions comparable to a flow-through substrate at a constant precious metal loading.

11. The emissions treatment system of claim 1, wherein the catalyzed particulate trap comprises a catalyzed particulate filter that exhibits a pressure drop comparable to an uncoated filter.

12. A method of treating an exhaust gas comprising hydrocarbons, carbon monoxide, nitrogen oxides, and particulates, the method comprising: locating an emissions treatment system downstream of a gasoline direct injection engine; providing a catalyzed particulate trap that comprises a three-way conversion (TWC) catalyst comprising an oxygen storage component deposited on a particulate trap in the emissions treatment system wherein an inlet side of the particulate trap comprises a layer of the three-way conversion catalyst thereon that has a thickness in the range of 10 to 50 microns; and contacting exhaust gas from the engine with the catalyzed particulate trap.

13. The method of claim 12 further comprising coating an inlet side or an outlet side of the particulate trap with a washcoat comprising palladium, a support, and an oxygen storage component.

14. The method of claim 12 further comprising coating an inlet side or an outlet side of the particulate trap with a washcoat comprising rhodium, a support, and an oxygen storage component.

15. The method of claim 12 further comprising depositing the catalyst in an amount of no more than 2 $g/in^3$ total on an inlet side and an outlet side.

16. The method of claim 15, wherein the catalyst is present in an amount in the range of 0.5 to 1.25 $g/in^3$.

17. The method of claim 12 further comprising providing a second three-way conversion catalyst upstream of the catalyzed particulate trap.

18. The method of claim 12 further comprising contacting the catalyzed particulate trap during cold start conditions and bypassing the catalyzed particulate trap after cold start conditions.

19. An emission treatment system downstream of a gasoline direct injection engine for treatment of an exhaust system comprising hydrocarbons, carbon monoxide, nitrogen oxides, and particulates, the emission treatment system comprising a catalyzed particulate trap having an oxidation catalyst or a three-way conversion catalyst deposited thereon; one or more gas sensors, an on-board diagnostic (OBD) system; and further comprising a NOx trap, an SCR catalyst, or both located downstream of the catalyzed particulate trap.

20. A method of treating an exhaust gas comprising hydrocarbons, carbon monoxide, nitrogen oxides, and particulates, the method comprising: locating an emissions treatment system downstream of a gasoline direct injection engine; providing a catalyzed particulate trap that comprises a three-way conversion (TWC) catalyst deposited on a particulate trap in the emissions treatment system; providing a second three-way conversion catalyst upstream of the catalyzed particulate trap; and contacting exhaust gas from the engine with the catalyzed particulate trap.

21. The method of claim 20 further comprising contacting the catalyzed particulate trap during cold start conditions and bypassing the catalyzed particulate trap after cold start conditions.

* * * * *

UNITED STATES PATENT AND TRADEMARK OFFICE
CERTIFICATE OF CORRECTION

PATENT NO. : 8,173,087 B2
APPLICATION NO. : 12/365182
DATED : May 8, 2012
INVENTOR(S) : Junmei Wei, Knut Wassermann and Yeujin Li It is certified that error appears in the above-identified patent and that said Letters Patent is hereby corrected as shown below:

In the Specifications

Col. 13, line 48 delete "600" and replace with "300"
Col. 13, line 49 delete "100" and replace with "381" and after μm add "(15 mil)"

Col. 14, line 40 delete "600" and replace with "300"
Col. 14, line 41 delete "100" and replace with "381" and after μm add "(15 mil)"

Col. 15, line 32 delete "600" and replace with "300"
Col. 15, line 33 delete "100" and replace with "381" and after μm add "(15 mil)"

Col. 16, line 24 delete "600" and replace with "300"
Col. 16, line 25 delete "100" and replace with "381" and after μm add "(15 mil)"

Signed and Sealed this
Thirteenth Day of August, 2013

Teresa Stanek Rea
*Acting Director of the United States Patent and Trademark Office*